United States Patent [19]

Miller

[11] Patent Number: 4,892,434

[45] Date of Patent: Jan. 9, 1990

[54] HANDLE BRACKET RETAINER

[75] Inventor: Drexel R. Miller, McHenry, Ill.

[73] Assignee: Cotter & Company, Chicago, Ill.

[21] Appl. No.: 264,835

[22] Filed: Oct. 31, 1988

[51] Int. Cl.⁴ .............................. B25G 3/02; F16D 1/00
[52] U.S. Cl. ..................................... 403/361; 403/243; 403/251
[58] Field of Search ............... 403/243, 247, 251, 281, 403/361; 294/54.5

[56] References Cited

U.S. PATENT DOCUMENTS

| | | |
|---|---|---|
| 426,048 | 4/1890 | Neill . |
| 490,098 | 1/1893 | Brinton ............................ 403/251 |
| 903,529 | 11/1908 | Wray . |
| 942,693 | 12/1909 | Wintermute . |
| 981,385 | 1/1911 | Cooper . |
| 1,354,549 | 10/1920 | Gilmer . |
| 1,492,596 | 5/1924 | Fenno . |
| 1,531,916 | 3/1925 | Flintjer . |
| 1,998,049 | 4/1935 | Fulton . |
| 2,214,939 | 9/1940 | Stirn . |
| 2,318,776 | 5/1943 | Haug ................................. 403/276 |

FOREIGN PATENT DOCUMENTS

| | | | |
|---|---|---|---|
| 659637 | 4/1938 | Fed. Rep. of Germany ...... 403/243 |
| 323 | of 1902 | United Kingdom ................ 403/243 |

Primary Examiner—Nicholas P. Godici
Assistant Examiner—Carmine Cuda
Attorney, Agent, or Firm—Edward D. Gilhooly

[57] ABSTRACT

A handle bracket retainer for retaining a handle to the socket of a plastic shovel, snow pusher, and the like without the need of the screws. The handle bracket retainer includes tapered body having a nearly semi-circular cross-section with opposed edges being tapered from end to end. A plurality of tabs and prongs permit a wooden handle to be retained in the socket of plastic tool.

12 Claims, 2 Drawing Sheets

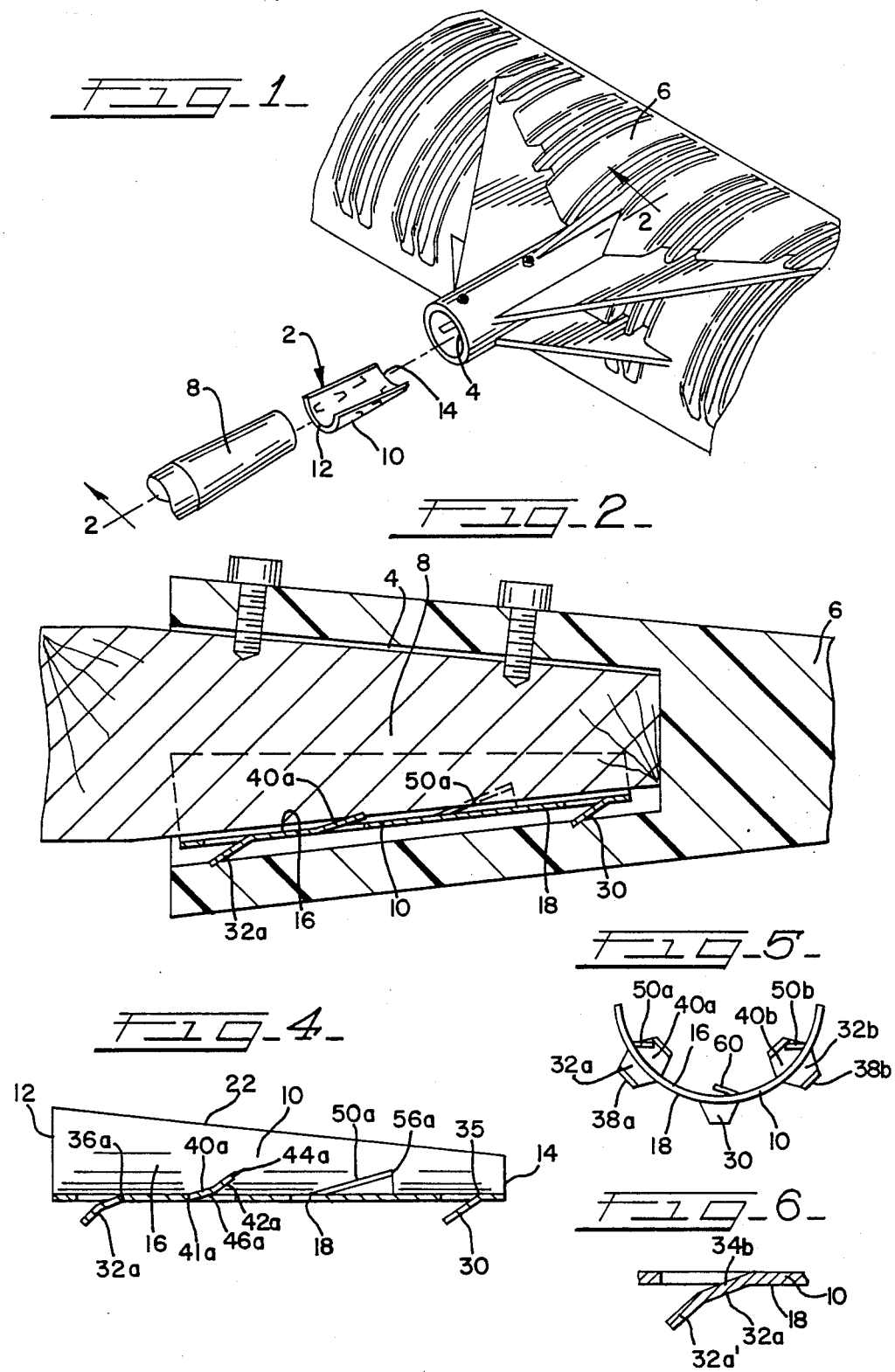

HANDLE BRACKET RETAINER

BACKGROUND OF THE INVENTION

1. Field of the Invention

This invention relates in general to retainers, and more particularly, to a handle bracket retainer for retaining a handle to the socket of a tool.

2. Description of the Prior Art

It is desirable in the shipment of tools, such as shovels, snow pushers, and the like, that the article be shipped in a knocked-down configuration, i.e. the tool handle and/or other parts being disassembled. By shipping in separate parts, the cost to the manufacturer and consumer is reduced, because the goods can be shipped in smaller containers to reduce transportation costs and the overall manufacturing cost is reduced due to decreased assembly labor. Aluminum and steel shovels and snow pushers have typically been shipped disassembled. The user merely inserted the wood handle into the metal tool, and tapped the parts together.

In recent years, however, plastic tools have gained wide acceptance. The threaded attachment of the wooden handle with metal tools as in the past was not practical in the case of plastic shovels and similar implements. It has been thus necessary for the manufacturer to assemble the plastic tool and wooden handle by screws prior to shipment. Assembled parts do not offer the benefits of economy previously available with metal tools which could be shipped in knock down form. Accordingly, there exists a need for a device which allows for proper and easy assembly of a plastic tool and wooden handle and permit disassembled transport of the tool parts from the manufacturer and/or seller.

SUMMARY OF THE INVENTION

It is an objective of the present invention to permit disassembled shipment of a plastic tool body and handle member and provide convenient and effective attachment of the parts as needed. Such objectives are attained by an improved bracket retainer herein disclosed that is positioned into the handle socket of a tool, such as a plastic shovel or snow pusher. The bracket retainer effectively retains the inserted end of a wooden handle in the tool socket, whether optional retaining screws are used or not. The bracket retainer of the invention is formed as an approximate semi-circular shell having a tapered configuration. The shell is formed with inwardly projecting prongs having triangular shapes that engage the handle end for retention. Additional prongs are further disposed on the shell for respective engagement of the socket and handle end. The prongs are arranged to prevent longitudinal and rotational relative movement between the parts for secure retention of a handle to a plastic shovel, snow pusher and the like, even if optional screws are not employed.

BRIEF DESCRIPTION OF THE DRAWINGS

FIG. 1 is a side perspective view, with parts exploded, of the handle retainer bracket of the invention;

FIG. 2 is a side elevational view, taken along lines 2—2 of FIG. 1;

FIG. 4 is a side elevational view, with parts in section, taken along lines 4—4 of FIG. 3;

FIG. 5 is an end elevational view of the handle bracket assembly of FIG. 3; and

FIG. 6 is a partial side elevational view, with parts in section, taken along lines 6—6 of FIG. 3.

DESCRIPTION OF A PREFERRED EMBODIMENT

Figure 3:
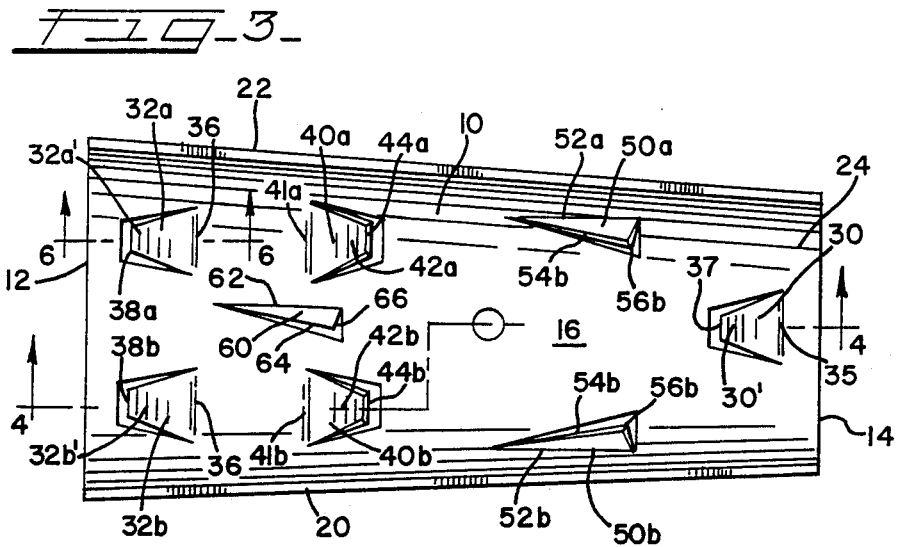
FIG. 3 is a top plan view of the handle retainer bracket shown in FIG. 3.

Referring now to the drawings, there is illustrated the handle bracket retainer of the invention, generally designated by reference numeral 2. The bracket retainer 2 is intended to be seated in the socket 4 of a plastic tool 6, such as a snow pusher, shovel, and the like, to retain the tapered end of a handle 8, commonly constructed of wood. The socket 4 is generally formed with a tapered internal configuration to match the shape of the tapered end 8 of the handle.

The handle bracket retainer 2 is preferably fabricated from a metal material and includes a shell-like body 10 having an approximate semi-circular cross sectional configuration (FIG. 5) that gradually decrease in radius from a larger open end 12 to a smaller opposite open end 14 along a longitudinal centerline axis. The internal surface 16 of the retainer bracket 2 generally matches a portion of the exterior of the tapered end 8 of the handle to be retained. Similarly, the outer surface 18 of the retainer bracket 2 generally corresponds to the internal shape of the tool socket 4. As seen in FIG. 4, the exposed longitudinal edges 20 and 22 defining a longitudinal opening 24 along the length of body 10 lie in a common plane that slopes downward from open end 12 to open end 14. Although the slope of the surface of edges 20 and 22 can slope at any angle to the longitudinal axis of the body 10, the angle may be 6 or 7 degrees dependent on the taper of the handle end and the socket.

The shell-like body 10 includes punched tabs or prongs 30, 32a and 32b extending outward from surface 18 and each having a generally truncated cone configuration viewing FIG. 3. The tabs 32a and 32b are symmetrically arranged near open end 12 about the horizontal center axis extending between first end 12 and second end 14 viewing FIG. 3. The tab 30 is symmetrically arranged about the longitudinal center axis between the first end 12 and second end 14 near the latter end. Each of the tabs 30, 32a, and 32b respectively have narrowed free end portions 30', 32a', and 32b' that frictionally engage the socket 4 in an inserted position of the handle to prevent relative movement therebetween in the fully inserted position of the handle end. From FIG. 3 it should be apparent that free end portion 30' is disposed in the same direction as free end portions 32a' and 32b'.

As seen in FIG. 6, the cross section configurations of tabs 32a and 32b are modified for ease of assembly and better retention of the parts. The narrowed free end portions 32a' and 32b' are bent outward at a greater angle than the tab base portions 34a and 34b. During transport the retainer bracket 2 is partially inserted into the tool socket 4 with the tabs 32a and 32b being externally positioned. After insertion of the handle as will be explained, the tabs snap into the socket. The bent free ends 32a' and 32b' then maintain the angular integrity of the tabs 32a and 32b with respect to surface 16 and provide a greater wedging effect with the socket wall for better retention. Tab 30 is connected to body 10 at connecting line 35, while tabs 32a and 32b are connected to body 10 at connecting lines 36 lying in a common plane disposed generally laterally of the longitudinal axis of body 10. The connecting line 35 lies in a plane parallel to the common plane of connecting lines 36. The free edge 37 of tab 3U and free edge 38a and 38b of tabs 32a and 32b are all disposed on an axis approximately parallel to the respective connecting lines at which the tabs are connected to body 10.

The tapered end 8 of the handle is retained in part within body 20 by a pair of tabs or prongs 40a and 40b having an approximate truncated cone configuration as also seen in FIG. 3. The tabs 40a and 40b are punched inward from surface 16 along connecting lines 41a and 41b and are symmetrically arranged about the longitudinal centerline between end 12 to end 14 on the opposite sides of tabs 32a and 32b from end 12. The tabs 40a and 40b have free end portions 42a and 42b that extend inward in the opposite directions viewing FIG. 3 than outwardly extending tabs 30, 32a and 32h. The free edges 44a and 44b extend along an axis that is approximately parallel to connecting lines 41a and 41b. Similarly, as described with respect to tabs 32a and 32b, the free end portions 42a and 42b are angularly bent at an acute angle to the plane of the base portion 46a and 46b of tabs 42a and 42b (FIG. 4) for better maintenance of the outward positioning of the tabs and greater frictional retention of the tapered end of the handle.

A pair of triangular shaped prongs 50a and 50b are punched out at an angle from surface 16 inwardly from body 20. The triangular prongs 50a and 50 are connected to body 20 along connecting lines 52a and 52b that are disposed generally parallel to the longitudinal axis between end 12 and end 14. The prongs 50a and 50b form sloped edges 54a and 54b terminating in a sharp free corners 56a and 56b. A third triangular prong 60 is formed between tabs 40a and 40b also project inwardly from body 10. The line 62 connecting the prong 60 to the body 10 lies in parallel relationship to the axes of connecting lines 52a and 52b in parallel relationship thereto. The prong 60 also forms a sloped free edge 64 having a sharp corner 66. When the tapered end 8 of the handle is inserted into the wide end 12 of the body 10, the edges 54a, 54b and 64 bite into the handle end 8 for further retention. The prongs 50a,b and 60 are particularly useful in preventing relative rotational movement.

Before assembly, the handle retainer bracket 2 can be shipped partially inserted in socket 4 with the tabs 32a,b being exteriorly disposed. With the handgrip (not shown) of the handle in proper position relative to the tool such as a blade and the like, the tapered end 8 of the handle is pushed into socket 4 adjacent surface 16 as far as possible. After rechecking the hand grip position, the handle can be tapped into final position. In the assembled position, the handle retainer bracket 2 is pushed fully into socket 4 with the tabs 32a and 32b bearing in a frictional wedged position against the internal wall of the socket as best shown in FIG. 2. The prongs 50a, 50b and 60 bite into the tapered handle end 8, and the remaining tabs 30, and 40a and 40b respectively engage the socket and handle end for firm retention.

What is claimed is:

1. A handle bracket retaining for retaining the end of a handle in the socket of a hand tool comprising
    a one-piece body forming a curved open shell having a longitudinal axis extending from a first open end in which the handle end is inserted to a smaller second open end, said shell further having a tapered configuration from said first end to said second end to form an internal surface generally matching the exterior shape of the handle end and an outer surface generally matching the internal shape of the socket of the tool,
    said body having tab means respectively being formed angularly inward from said inner surface and angularly outward from said outer surface, said tab means including a plurality of outer tabs bent extending outward from said outer surface near said first open end along respective lines connecting said plurality of tabs to said body and forming free end portions for engaging the socket, said connecting lines of said plurality of outer tabs being disposed in a common plane arranged laterally to said longitudinal axis of said body, said body being capable of being at least partially positioned in said socket prior to insertion of the end of handle with said outer plurality of tabs being arranged exteriorly of said socket,
    a third tab extending outward from said outer surface near said second open end along another connecting line disposed in a second plane generally parallel to said common plane, said third tab forming a free end for engaging the socket, said tab means further including at least one inner tab extending inward from said inner surface from a connecting line and forming a free end portion for engaging the end of the handle, said at least one inner tab extending inward from said inner surface in a direction relative to said longitudinal axis opposite to said direction said plurality of outer tabs extend outward from said outer surface,
    said inner surface being arranged to be positioned in confronting relationship to the the end of the handle when the end of handle is inserted into said body positioned in the tool socket with said plurality of outer tabs being arranged exteriorly of the socket, and said plurality of outer tabs being snapped into contact with the internal surface of the socket upon said handle end being fully inserted into said body, and
    said plurality of tabs respectively acting frictionally to engage the end of the handle and the internal surface of the socket for preventing relative movement therebetween when the end of the handle is fully inserted into the socket of a tool.

2. The handle bracket retainer according to claim 1 wherein said at least one inner tabs includes a pair of inner tabs bent inward of said inner surface, said pair of inner tabs having free end portions for engaging the end of the handle.

3. The handle bracket retainer according to claim 1 wherein said pair of inner tabs extends outward from said inner surface in the opposite direction relative to said longitudinal axis than said pair of tabs extending outward from said outer surface.

4. The handle bracket retainer according to claim 1 wherein said plurality of outer tabs comprise a pair of outer tabs symmetrically arranged relative to said longitudinal axis.

5. The handle bracket retainer according to claim 4 wherein said pair of outer tabs extend from said outer surface toward said first opening in a direction relative to said longitudinal axis.

6. The handle bracket retainer according to claim 1 wherein said free end portions of said at least one inner tab and said plurality of outer tabs being disposed in a plane lying at an acute angle to the plane of the remaining portions of said tabs.

7. The handle bracket retainer according to claim 1 further comprising at least one prong having a triangular configuration extending inward from said inner surface.

8. The handle bracket retainer of claim 7 wherein one of said prongs is positioned between said pair of inner tabs in a lateral direction relative to said longitudinal axis.

9. The handle bracket retainer according to claim 7 wherein said at least one prong is connected to said body along one of the sides defining said triangular configuration of said at least one prong, said one of said sides extending along an axis parallel to said longitudinal axis.

10. The handle bracket retainer according to claim 9 wherein said at least one prong comprised three spaced prongs having a triangular configuration extending inward from said inner surface.

11. The handle bracket retainer according to claim 10 wherein said plurality of outer tabs, said third tab, and said at least one inner tab having a free edge on said free end portions disposed in parallel relationship to said connecting lines.

12. The handle bracket retainer of claim 10 wherein said at least one inner tab is positioned between said pair of outer tabs and said third tab in a direction relative to said longitudinal axis.

* * * * *